R. WENDELKEN.
CARBURETOR.
APPLICATION FILED AUG. 12, 1918.

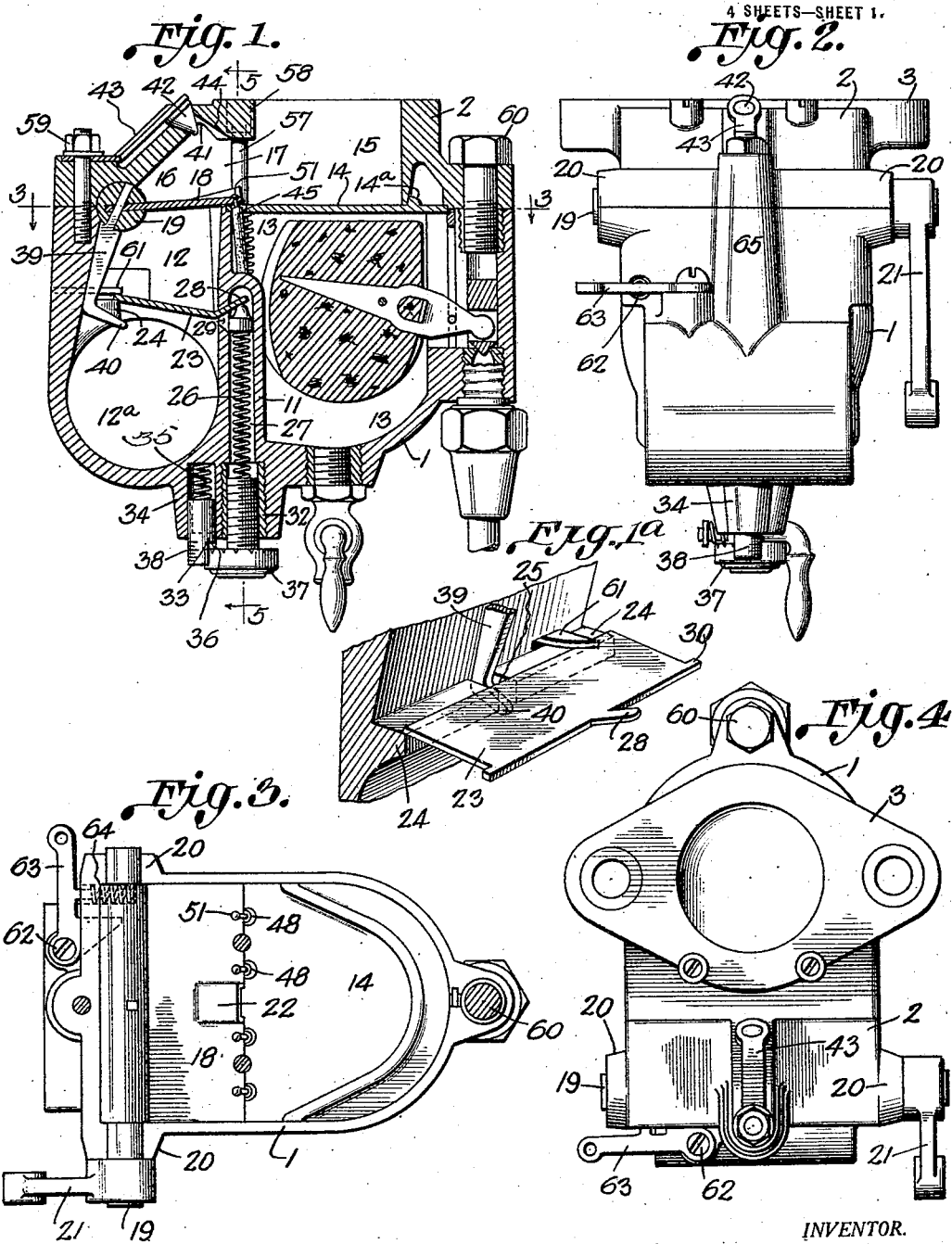

1,413,440.

Patented Apr. 18, 1922.
4 SHEETS—SHEET 2.

INVENTOR.
Richard Wendelken
BY
ATTORNEY.

R. WENDELKEN.
CARBURETOR.
APPLICATION FILED AUG. 12, 1918.

1,413,440.

Patented Apr. 18, 1922.
4 SHEETS—SHEET 3.

INVENTOR.
Richard Wendelken
BY
ATTORNEY.

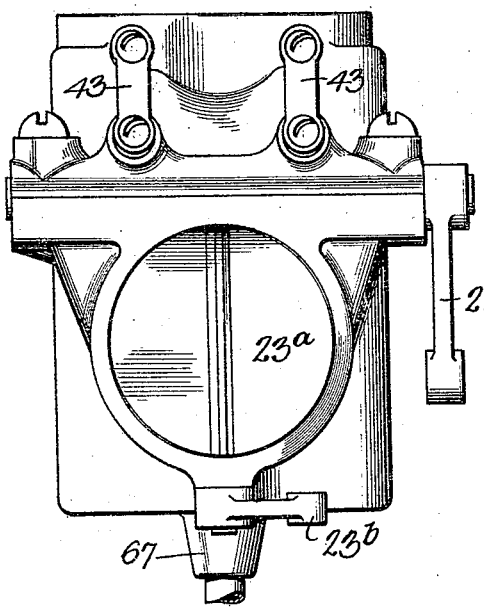
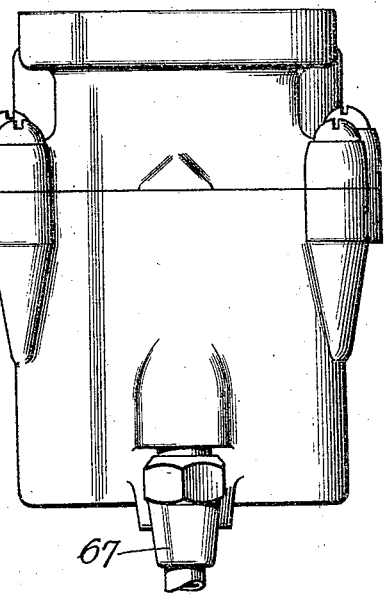
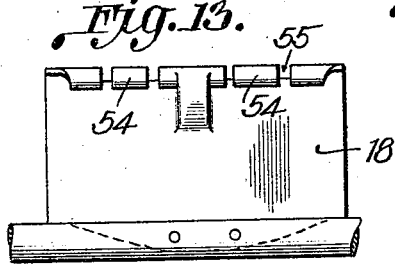
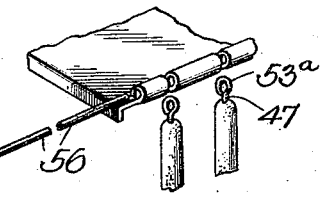

UNITED STATES PATENT OFFICE.

RICHARD WENDELKEN, OF NEW YORK, N. Y., ASSIGNOR, BY MESNE ASSIGNMENTS, TO JULIUS WINTER, OF NEW YORK, N. Y.

CARBURETOR.

1,413,440.        Specification of Letters Patent.    Patented Apr. 18, 1922.

Application filed August 12, 1918. Serial No. 249,534.

*To all whom it may concern:*

Be it known that I, RICHARD WENDELKEN, a citizen of the United States, residing at New York, in the county of Bronx and State of New York, have invented new and useful Improvements in Carburetors, of which the following is a specification.

This invention relates to improvements in carburetors for internal combustion engines, and has for its objects to provide improvements in carburetors of the type in which the liquid hydrocarbon is held in suspension by absorbent elements, whereby such absorbent elements are operatively connected with the main air valve and so arranged as to increase or decrease the quantity of gasoline supplied in accordance with the increase or decrease in the quantity of air and in which the absorbent elements may be readily renewed or replaced. The invention further contemplates improvements in the carburetor as an entirety with the objects of securing accurate proportioning of the constituents of the mixture under all conditions of running, of simplicity, compactness and ready accessibility of organization and of providing a structure wherein the casing parts are particularly adapted for manufacture from a phenolic condensation product, which substance, for reasons of manufacturing facility, the smoothness of the surfaces which are exposed to the liquid hydrocarbon and the fact that such material will not promote condensation of the vapor of the hydrocarbons is to be preferred for such use.

Further objects are to provide in a structure of the type set forth a main air valve, a fuel valve, and an auxiliary air valve and valve organization which will be simple in construction, certain and reliable in operation and most sensitive to control.

The features of the invention are susceptible of various structural expressions and may be embodied in carburetors of various forms, certain of which are illustrated, by way of example, in the accompanying drawings, wherein:—

Figure 1 is a vertical section through my improved carburetor.

Figure 1ª is a perspective view of the main air valve and actuating means.

Figure 2 is an end elevation of the carburetor shown in Figure 1.

Figure 3 is a section taken on lines 3—3 of Figure 1.

Figure 4 is a plan view.

Figure 10 is a top plan view and Figures 11 and 12 are end elevations, respectively, of the form shown in Figure 9.

Figure 13 is a plan view and Figures 14 and 15 are front elevations of an alternative form of main or fuel valve shown in connection with an embodiment illustrated in Figure 9.

Figure 16 is a detail showing the alternative mounting of the absorbent strips on the main air valve.

Similar characters of reference designate corresponding parts throughout the several views.

Figure 5:
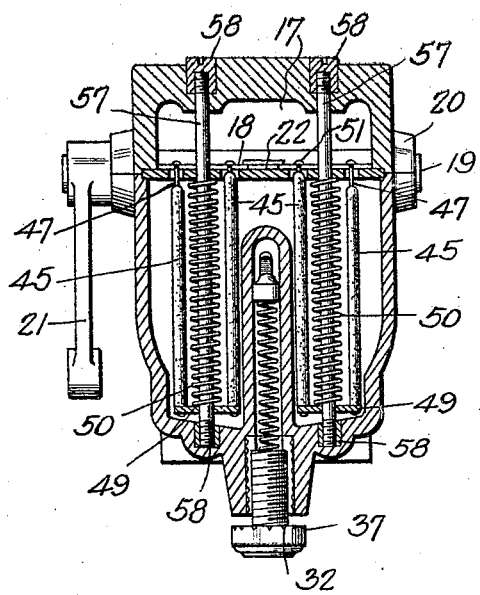
Figure 5 is a section taken on lines 5—5 of Figure 1.
Figure 6:
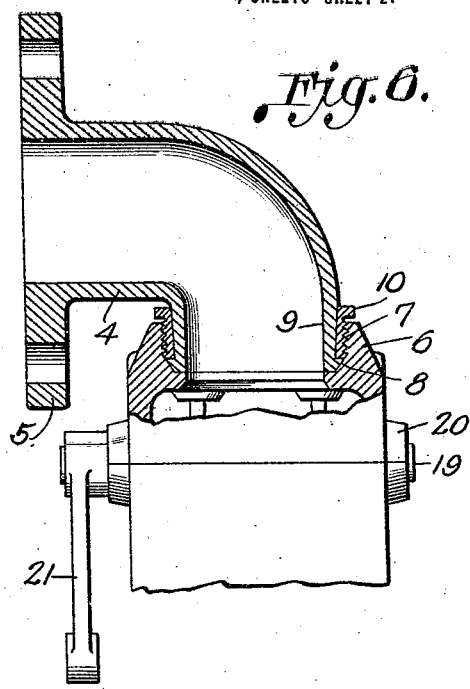
Figure 6 is a side elevation, partly in section, showing a modified form of connection with the in-take manifold and engine.
Figure 7:
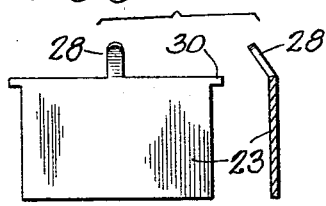
Figure 7 is a detail plan and also shows a vertical sectional view of the main air valve.
Figure 8:
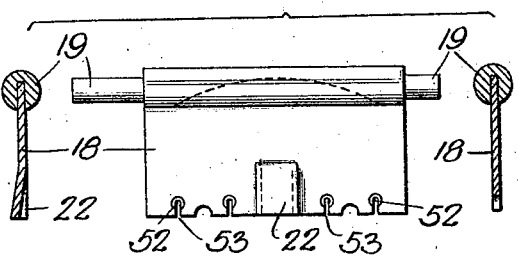
Figure 8 is a detail plan view of the fuel valve and also shows sections taken through the valve at channel 22 and at one of the slots 53, respectively.
Figure 9:
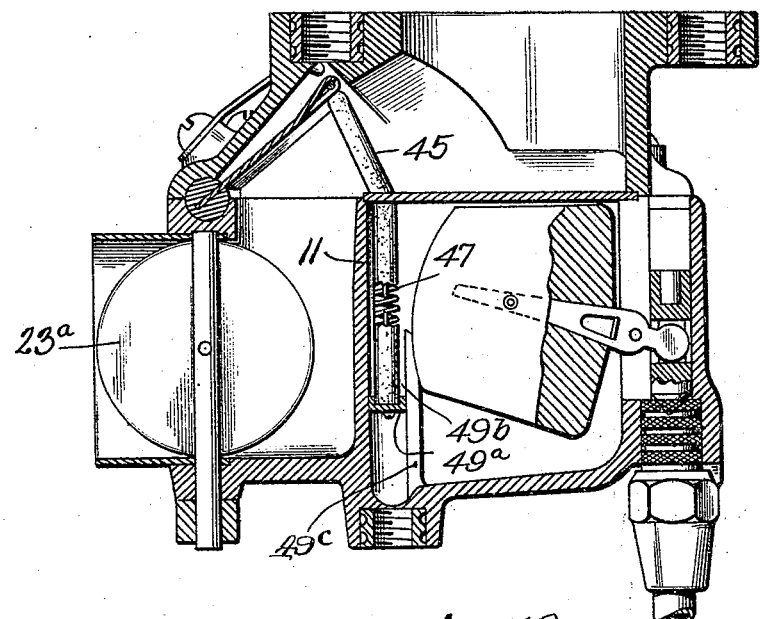
Figure 9 is a vertical section through a modified form of the carburetor.
Figure 10:
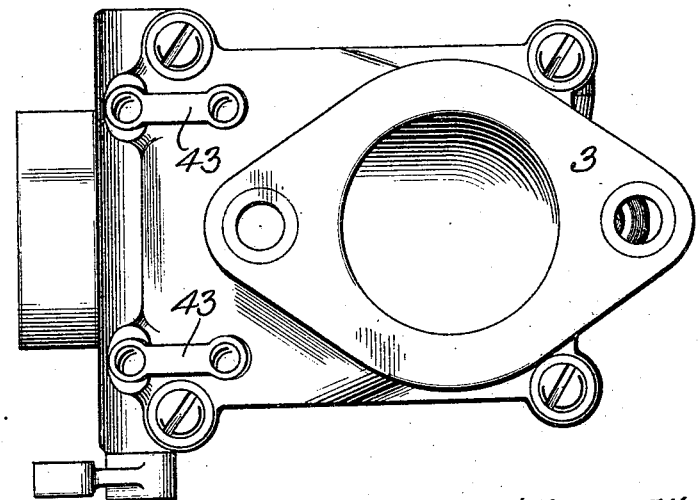

Referring to Figures 1 to 8:

The casing of the carburetor includes a body part 1 and an upper part 2 which is detachably secured on the body 1 and is adapted for attachment to the intake manifold of the engine (not shown) with which it is in open communication. The upper part 2 may, as shown in Figures 2 and 4, have an attachment flange 3 formed integral therewith or it may as shown in Figure 6, be adapted for connection to an angular coupling 4 which is provided with an attachment flange 5. In the latter case the part 2 is formed along its upper side with an annular boss 6, internally threaded, as at 7, and having an internal annular shoulder 8 and the coupling 4 has an annular neck 9 which fits within the boss 6 and is securely retained therein by a split clamping nut 10 which is engaged with the threads 7 and bears upon the shoulder 8. The parts 1 and 2 are preferably made of phenol condensation product and are provided with threaded metal bushings, cast therein, for cooperation with such various bolts, screw stems or the like as may be required.

The body 1 is formed or provided with a transverse partition 11 by which its interior is divided into an air chamber 12 and a fuel chamber 13, the latter, as shown and preferred, enclosing the float element of the float feed mechanism. The chamber 13 is closed at the top by a cover plate 14 which rests upon the partition 11 and the vertical walls of said chamber and is clamped in position by the upper part 2. The plate 14 and the upper part 2 may, if desired, and as shown, be formed in sections, one of which has a marginal lip 14$^a$ to overlap and close the joint with the other.

The upper part 2 is fashioned, internally, to provide a mixing chamber 15 located above the plate 14 and a valve chamber 16 located above the air chamber 12 and in open communication with the chamber 15 by a passage 17. The air chamber 12 communicates with the mixing chamber 15 by the passage 17 and its communication is controlled by the fuel valve 18 which projects across the upper end of the air chamber and as it is raised or lowered increases or decreases the effective area of the passage 17 as a means of communication between the air chamber and the mixing chamber. The valve 18 is of the "flap" type, being formed as a substantially flat plate whose outlines, preferably rectangular, conforms to that of the chamber 16. Said valve is suitably mounted upon or secured to a transverse rock shaft 19 having end bearings 20 which are set in mating recesses of the casing parts 1 and 2. At one end the shaft 19 carries an external arm 21 adapted for connection to the linkage or mechanism by which the movements of the valve 18 are effected and controlled. When fully closed, as shown in Figure 1, the free edge of the valve 18 rests upon the upper edge of the partition 11; but in order that the communication of the air chamber 12 and the mixing chamber 15 may not be completely interrupted in the fully closed position of the valve, the latter has in its under face a narrow and shallow channel 22 by which sufficient air will be passed to the mixing chamber to enable the engine to run at low or throttling speed.

The chamber 12 is provided in its lower portion with air inlet openings 12$^a$ preferably located at opposite sides of the casing and to which a conducting pipe (not shown) for supplying preheated air may be connected if desired, the preheating of the air being effected by the exhaust gases or in any other suitable manner, all as well known in the art. The supply of air from the chamber 12 to the mixing chamber 15 is controlled by a main air valve 23 which is preferably of the "flap" type and is pivotally movable about a horizontal axis, being raised by the suction of the engine or positively as hereinafter described to increase the amount of air supplied or lowered by spring pressure to decrease it. The valve 23 conforms in outline to the chamber 12 and is preferably rectangular. When in fully closed position the free edge of the valve 23 rests upon ledges 24 provided at the side of the air chamber opposite the pivot of the valve and between which there is a somewhat narrow space 25 affording constant communication between the lower or inlet portion of the air chamber and its upper portion, whereby in the fully closed position of the valve 23, sufficient air will be admitted to enable the engine to run at low or throttling speed, such air passing into the upper portion of the chamber 12 and thence through the channel 22 of the valve 18 and the passage 17 to the mixing chamber 15.

In the construction preferred the pivotal axis of the valve 23 is located adjacent the partition 11 and the valve is spring urged toward its closed position, the spring, as 26, being housed in a chamber 27 of said partition and acting at its upper end on a tail piece 28 which projects at an angle beyond the pivot of the valve through a suitable opening 29 formed in the adjacent wall of the chamber 27. For its pivotal mounting the valve 23 may be provided with end trunnions 30 (Figure 7) fitting in suitable bearings secured in the sides of the chamber 12. In order that the pressure with which the spring 26 acts on the valve may be regulated, a screw stem 32 against which the lower end of the spring seats is threaded in the chamber 27, said screw stem having an externally located head 37 by which it may be turned. A suitable spring urged detent 33 may be provided for holding the screw stem against turning and in the construction preferred this detent has the form of a bolt which is slidable in an external boss or socket 34 formed upon the body 1, the spring 35 which acts on said bolt being housed in said socket. The bolt 33 has a suitably formed tooth 36 for engagement in any one of the notches arranged at close intervals along the circumference of the head 37. Said bolt may also be provided with suitable calibrations 38 readable in connection with the edge of the socket 34 for the purpose of indicating the degree of compression of the spring 26.

In the preferred construction the valve 23 is positively operated in correlation to the main valve 18 throughout a higher range of speeds, its operation throughout the lower range being in response to engine suction. For these purposes the rock shaft 19 which carries the valve 18 is provided with a depending arm 39 which projects into the space 25 between the ledges 24 and has an inwardly directed nose 40 for engagement with the valve 23 from below. The angular relation of the arm 39 on the shaft 19 is such that when both of the valves 18 and 23 are closed said arm will be spaced to a certain extent from the free edge of the valve 23. It follows that the valve 18 may be operated through an initial range during which the nose 40 will not, in any case, engage the valve 23 and the latter is therefore free to play, in response to suction variations, within the limit of such initial range of the valve 18. When the valve 18 is moved beyond the said initial range the nose 40 will engage the valve 23 and positively raise the latter in correlation to the further movement of the valve 18.

In order to provide for an additional air supply in the comparatively infrequent cases when the normal maximum amount of air delivered from the chamber 12 is insufficient the chamber 16 has in its upper wall an auxiliary air opening 41 which is normally closed by a valve 42 held seated by a spring 43. The valve 42 is preferably of conical form and projects through the opening 41 into the chamber 16 whereby it may be engaged and opened by the valve 18 when the latter is moved beyond its normal fully open position. The chamber 16 is formed whereby a clearance of channel 44 is afforded between the free edge of the valve 18 and the wall which said edge confronts when said valve is positioned to open the valve 42. The clearance 44 communicates with the opening 41 and when the valve 42 is opened provides a passage leading to the passage 17 and through which the auxiliary air admitted by said opening may flow to the mixing chamber 15. Instead of a single opening 41 and valve 42 as shown in Figures 1 and 2, two or more of said openings and valves may be provided, two being shown in the embodiment of Figures 10 to 13.

The air which flows into the chamber 16 takes up the gasoline of the mixture, in the form of vapor, from absorbent elements 45 which are exposed to such air in the passage 17. Each absorbent element comprises a body of felt or equivalent material which is submerged in the liquid fuel in the chamber 13 and is mounted upon a flexible wire 47. Any desired number and grouping of the absorbent elements may be employed and their bodies 46 may have any desired proportions and cross sectional form and may be fixed to the wires 47 in any suitable manner. The absorbent elements are preferably located closely adjacent the partition 11 and are operated by the valve 18, that is to say they are moved across the passage 17 and exposed in greater or less degree to the air flowing through said passage, accordingly as the valve 18 may be raised or lowered, their movement being through suitable openings 48, in the plate 14.

In order that the absorbent elements may be raised their wires 47 are suitably connected at their upper ends to the valve 18 and in order that said elements may be lowered their lower ends are connected to cross heads 49 which are urged downward by springs 50 acting between them and the plate 14. Any suitable form of connection may be provided between the wires 47 and the valve 18. For example, as shown in Figures 1, 3, 5 and 8, the wires 47 may have heads 51 for engagement in countersunk openings 52 in the valve 18, said openings being at the ends of slots 53 extending to the free edge of the valve and through which the wires are fitted. Or, alternatively, the connections may have the form shown in Figures 14–17, according to which the wires 47 are formed with eyes 53$^a$ at their upper ends and the valve 18 is formed along its free edge with alining beads 54 having spaces 55 between them in which the eyes are disposed, the connection being similar to a knuckle hinge joint and being completed by a hinge pin 56 fitted through the eyes and through the beads.

In the embodiment of Figures 1 to 8 the elements 45 are provided in two groups of two each, each pair being connected to a cross head 49 and the latter being mounted on a vertical stem 57 which provides a guide and is also utilized as a mounting for the spring 50 by which the cross head is urged downward. In such embodiment the stems 57 may be utilized for the connection of the parts 1 and 2 and for this purpose they are extended through openings in the plate 14 and have their lower ends anchored in the body 1 and their upper ends threaded and engaged with nuts 58 seating in recesses in the upper face of the part 2. The parts 1 and 2 are also connected by fastenings 59 and 60, the former being utilized to secure the spring 43 which carries the valve 42.

If desired, and as shown and preferred, the absorbent elements 45 may have the upper terminals of their felt bodies at different elevations whereby only the longer of said elements will be exposed for an initial range of lower speeds and all of the elements will be exposed, in greater or less degree in accordance with the extent of opening of the valve 18 for the range of higher speeds. It is to be noted that the longest of the absorbent elements will have their upper ends substantially flush with the upper face of the plate 14, in the closed position of the valve 18, whereby the air, passed by the channel 22, will take up sufficient fuel to maintain the operation of the engine at low or throttling speed.

In priming the main air valve 23 is held closed by a horizontally movable shutter 61 whose engaging end is normally located above the adjacent ledge 24 and clear of the free edge of said valve. The shutter 61 is preferably mounted on a vertical pivot 62 and projects through a slot in the wall of the chamber 12, its pivotal end being connected to an operating arm 63 which is acted on by a spring 64 to hold said shutter in its normal position. When the arm 63 is moved inward against the pressure of the spring 64 the shutter 61 is moved to overlie the valve 23, adjacent its free edge, thereby positively holding said valve closed.

Any suitable form of float and feed mechanism may be used in connection with the fuel chamber 13, the particular type illustrated forming the subject-matter of a concurrent application.

In the modified construction shown in Figures 10 to 13, the main air valve, as 23$^a$, is operated independently of the fuel valve 18 and is of the butterfly type, its shaft having an external operating arm 23$^b$. A further departure consists in the connection of all the absorbent elements to a single cross bar 49$^a$ whose ends operate in grooves 49$^b$ formed by the partition 11 and by flanges 49$^c$ parallel to said partition. The casing parts 1 and 2 are substantially rectangular in construction and are connected at their corners by fastening screws. The operations of the main valve 23$^a$, the absorbent elements 45 and the auxiliary air valves 42 are the same as in the embodiment of Figures 1 and 4.

It will be understood that the features of the invention and the form and arrangement of the carburetor casing parts are susceptible of various modifications within the scope of the appended claims.

Having fully described my invention, I claim:—

1. A carburetor comprising a body having a fuel chamber, an air chamber, an air inlet passage to said chamber, and a mixing chamber adapted to communicate with the air chamber and with the intake manifold of the motor, a pivoted valve controlling the communication of the air and the mixing chamber, fuel feeding elements yieldably mounted in the fuel chamber and connected to the free end of said valve, and means for manually operating said valve to increase and decrease the degree of communication of the air chamber and the mixing chamber whereby said elements are exposed in greater or less degree to the air passing to the mixing chamber.

2. A carburetor comprising a body having a fuel chamber, an air chamber, an air inlet passage to said chamber, a mixing chamber adapted to communicate with the air chamber and with the intake manifold of a motor, a pivoted valve controlling the communication of the air chamber and the mixing chamber, and fuel feeding elements of different lengths yieldably mounted in the fuel chamber and connected to the free edge of said valve whereby as the latter is moved to increase or decrease the degree of communication of the air chamber and the mixing chamber said elements are exposed in greater or less degree to the air passing to the mixing chamber, the longest of said elements being slightly exposed to the mixing chamber when said valve is in closed position, said valve having a channel formed therein whereby sufficient air may pass to said mixing chamber when the valve is closed to form a combustible mixture.

3. A carburetor comprising a body having a fuel chamber, an air chamber, an air inlet passage to said air chamber, a mixing chamber adapted to communicate with the air chamber and with the intake manifold of the motor, a valve controlling the communication of the air chamber and the mixing chamber, flexible absorbent elements disposed in the fuel chamber and connected at one end to said valve whereby as the latter is operated to increase or decrease the degree of communication of the air chamber and the mixing chamber, said elements are exposed in greater or less degree to the air passing to the mixing chamber, a head movably mounted in the fuel chamber and to which the other ends of said elements are connected and a spring acting on said head tending to maintain the absorbent elements within the fuel chamber and said valve in closed position.

4. A carburetor comprising a body having a fuel chamber, an air chamber and an air inlet passage to said air chamber, a mixing chamber adapted to communicate with the air chamber and with the intake manifold of the motor, a pivoted valve controlling the communication of the air chamber and the mixing chamber, a spring pressed head movably mounted in the fuel chamber and flexible absorbent elements comprising wires connected to said head and to said valve and bodies of absorbent material mounted on said wires for exposure, in greater or less degree, to the air passing to the mixing chamber, accordingly as said valve is operated to increase or decrease the degree of communication of the air chamber and the mixing chamber.

5. A carburetor having a casing comprising a lower part and an upper part secured on said lower part, the latter having a vertical partition dividing the casing into a fuel chamber and an air chamber having an air inlet, the upper part being formed to provide a mixing chamber located above the fuel chamber and adapted to communicate with the air chamber and with the intake manifold of a motor, a plate arranged between said parts and separating the fuel chamber from the mixing chamber, a flexible absorbent element yieldably mounted in the fuel chamber, the plate having an opening through which said element may project, and a movable valve arranged above the air chamber to control the communication thereof with the mixing chamber, the valve being connected to said absorbent element to effect its exposure, in greater or less degree, accordingly as the valve is more or less open, to the air passing to the mixing chamber.

6. A carburetor having a casing comprising a lower part and an upper part secured on said lower part, the latter having a vertical partition dividing the casing into a fuel chamber and an air chamber having an air inlet, the upper part being formed to provide a mixing chamber located above the fuel chamber and adapted to communicate with the air chamber and with the intake manifold of a motor, a plate arranged between said parts and separating the fuel chamber from the mixing chamber, a pivoted valve controlling the communication of the air chamber and the mixing chamber, a spring pressed head slidably mounted in the fuel chamber adjacent said partition and flexible absorbent elements for which said plate is provided with openings, said elements comprising wires connected to said head and detachably connected to said valve adjacent its free edge and bodies of absorbent material mounted on said wires for exposure, in greater or less degree, to the air passing to the mixing chamber, accordingly as said valve is opened to a greater or less degree.

7. A carburetor comprising a body having a fuel chamber, a mixing chamber for air and fuel adapted to communicate with the intake manifold of the engine, an air chamber located below said mixing chamber and at one side of the fuel chamber, and provided with an air inlet, a wall separating said fuel and air chambers, a valve chamber located above the air chamber and in communication therewith and with the mixing chamber, a valve pivotally mounted in the valve chamber with its free edge adjacent the mixing chamber and adapted to seat against said wall, said valve controlling the communication of the air chamber and the mixing chamber, the upper body wall of the valve chamber having an auxiliary air opening adapted to communicate through said valve chamber with the mixing chamber, and a spring pressed valve normally closing said opening and arranged for operation by engagement with said pivoted valve when the latter is moved beyond its normal opened position.

8. A carburetor comprising a body having a fuel chamber, a mixing chamber for air and fuel adapted to communicate with the intake manifold of the motor, an air chamber located below said mixing chamber and at one side of the fuel chamber and provided with an air inlet, a vertical wall separating said fuel and air chambers, a valve chamber located above the air chamber in communication therewith and with the mixing chamber, and a valve pivotally mounted in the valve chamber with its free end adjacent the mixing chamber and adapted to seat against said vertical wall, said valve controlling the communication of the air chamber and the mixing chamber, and having a channel in its under face through which air may pass to the mixing chamber when the valve is closed, to enable the engine to operate at low speed.

9. A carburetor comprising a body having a fuel chamber, a mixing chamber for fuel and air adapted to communicate with the intake manifold of the motor, an air chamber located below said mixing chamber and at one side of the fuel chamber and provided with an air inlet passage located above the air chamber in communication therewith and with the mixing chamber, a valve pivotally mounted in the valve chamber and controlling the communication of the air chamber and the mixing chamber, a second valve located in the air chamber below the first valve and controlling the communication of the air inlet with the air chamber, an arm depending from the pivot of the first valve and having an angular nose for operating the second valve from below and a spring to move the second valve to closed position, said arm having initial play with reference to the second valve whereby the latter may operate in response to suction variations independently of the angular position of said arm.

10. A carburetor comprising a body having a fuel chamber, a mixing chamber for fuel and air adapted to communicate with the intake manifold of the motor, an air chamber located below said mixing chamber and at one side of the fuel chamber and provided with an air inlet, a valve chamber located above the air chamber in communication therewith and with the mixing chamber, a recessed wall separating said fuel and air chambers, a pair of flap valves, one of which, to control the communication of the air chamber and the mixing chamber, is located in said valve chamber with its free edge adjacent the mixing chamber and adapted to seat against said wall, and the other of which, to control the communication of said air inlet with the air chamber, is located in the air chamber with its free edge adjacent the side thereof which is adjoined by the pivot of the first valve, a spring located within said recessed wall to move the second valve to closed position, and an arm depending from the pivot of the first valve and having an angular nose for opening the second valve.

11. A carburetor comprising a body having a fuel chamber, a mixing chamber for fuel and air adapted to communicate with the intake manifold of the motor, an air chamber located below said mixing chamber and at one side of the fuel chamber and provided with an air inlet, a valve chamber located above the air chamber in communication therewith and with the mixing chamber, a valve pivotally mounted in the valve chamber and controlling the communication of the air chamber and the mixing chamber, a second valve located in the air chamber below the first valve and controlling the communication between said air inlet and air chamber, an arm depending from the pivot of the first valve and having an angular nose for operating the second valve from below, a spring to move the second valve to closed position, said arm having initial play with reference to the second valve whereby the latter prior to its engagement of said nose, may operate in response to suction variations, and a normally disengaged shutter adapted to be moved into engagement with the second valve for positively holding the same in closed position for priming.

12. A carburetor comprising a body having a fuel chamber, a mixing chamber for fuel and air adapted to communicate with the intake manifold of a motor, an air chamber located below said mixing chamber and at one side of the fuel chamber and provided with an air inlet, a valve chamber located above the air chamber in communication therewith and with the mixing chamber, a valve mounted in the valve chamber and controlling the communication of the air chamber and the mixing chamber, a second valve mounted in the air chamber and controlling the communication of the air inlet and air chamber, means for operating the second valve from the first one, said means permitting the second valve to act in response to suction variations during an initial stage of the opening movement of the first valve, and means for positively holding the second valve closed during priming.

13. A carburetor comprising a body having a fuel chamber, a mixing chamber for communication with the intake manifold of a motor, an air chamber for communication with the mixing chamber and provided with an air inlet, a valve in said air chamber to control the communication of said air inlet with said air chamber, a spring for moving said valve to closed position, a screw stem upon which said spring seats and by which the strength of the spring may be regulated, said stem having an external head, and a spring pressed bolt for locking engagement with said head, said bolt being parallel to said screw stem and provided with calibrations by which the strength of said spring may be read.

14. A carburetor comprising a body formed with a fuel chamber, a mixing chamber and an air chamber adapted to communicate with each other, a fuel valve and a pivoted main air valve for controlling this communication, said fuel valve having a channel formed therein, and a slotted shoulder formed on the interior of the body wall of the air chamber, said slot being partially covered by the free end of said pivoted air valve when the latter is in closed position whereby proper quantities of air and fuel may be fed to said mixing chamber to form a combustible mixture therein when both of said valves are in closed position.

15. A carburetor comprising a body formed with a fuel chamber, a mixing chamber and an air chamber adapted to communicate with each other, a fuel valve and a pivoted main air valve for controlling this communication, said fuel valve having a channel formed therein, a slotted shoulder formed on the interior of the body wall of the air chamber, said slot being partially covered by the free end of said pivoted air valve when the latter is in closed position whereby proper quantities of air and fuel may be fed to said mixing chamber to form a combustible mixture therein when both of said valves are in closed position, and an arm depending from said fuel valve and passing through the slot of said shoulder for positively actuating said air valve.

16. In a carburetor a casing provided with an air chamber having a main air inlet passage in communication therewith, a mixing chamber having an auxiliary air inlet passage and a fuel chamber, a suction responsive air valve controlling the communication of said main air inlet passage with said air chamber, an auxiliary air inlet valve controlling the auxiliary air inlet passage, a fuel valve controlling communication between said air, fuel and mixing chambers, said fuel valve being constructed to positively actuate said main air valve after an initial period of its opening movement and to positively actuate said auxiliary air valve in the final period of its opening movement.

In testimony whereof I have hereunto set my hand in presence of two subscribing witnesses.

RICHARD WENDELKEN.

Witnesses:
BERNARD KOHN,
SIGMUND SPANGLET.